Oct. 3, 1950
H. C. DOOLITTLE
2,524,654
BOX STRAPPING TOOL
Filed June 20, 1945
5 Sheets-Sheet 1
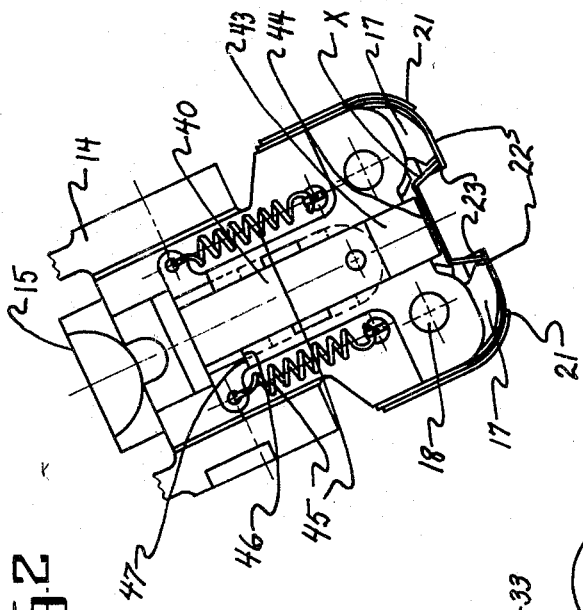
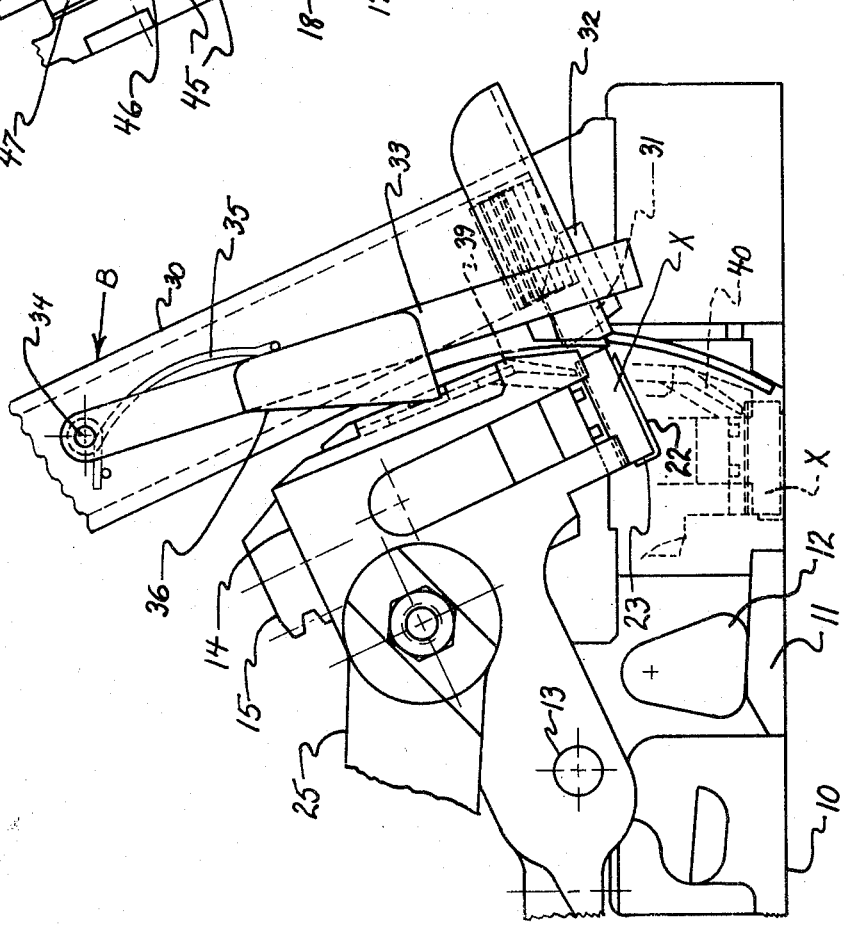
INVENTOR
HOWARD C. DOOLITTLE
BY Lindsey and Robillard
ATTORNEYS

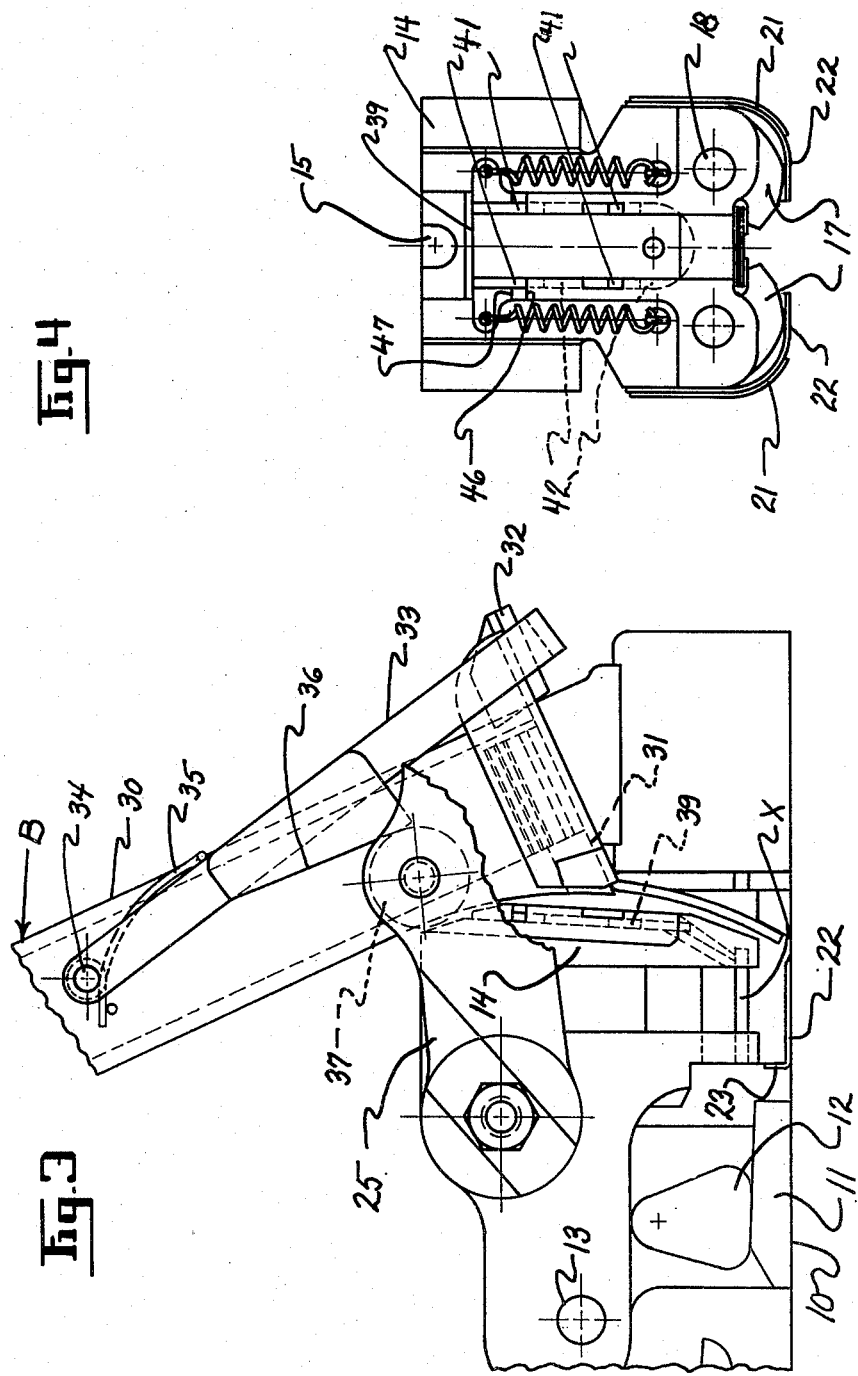

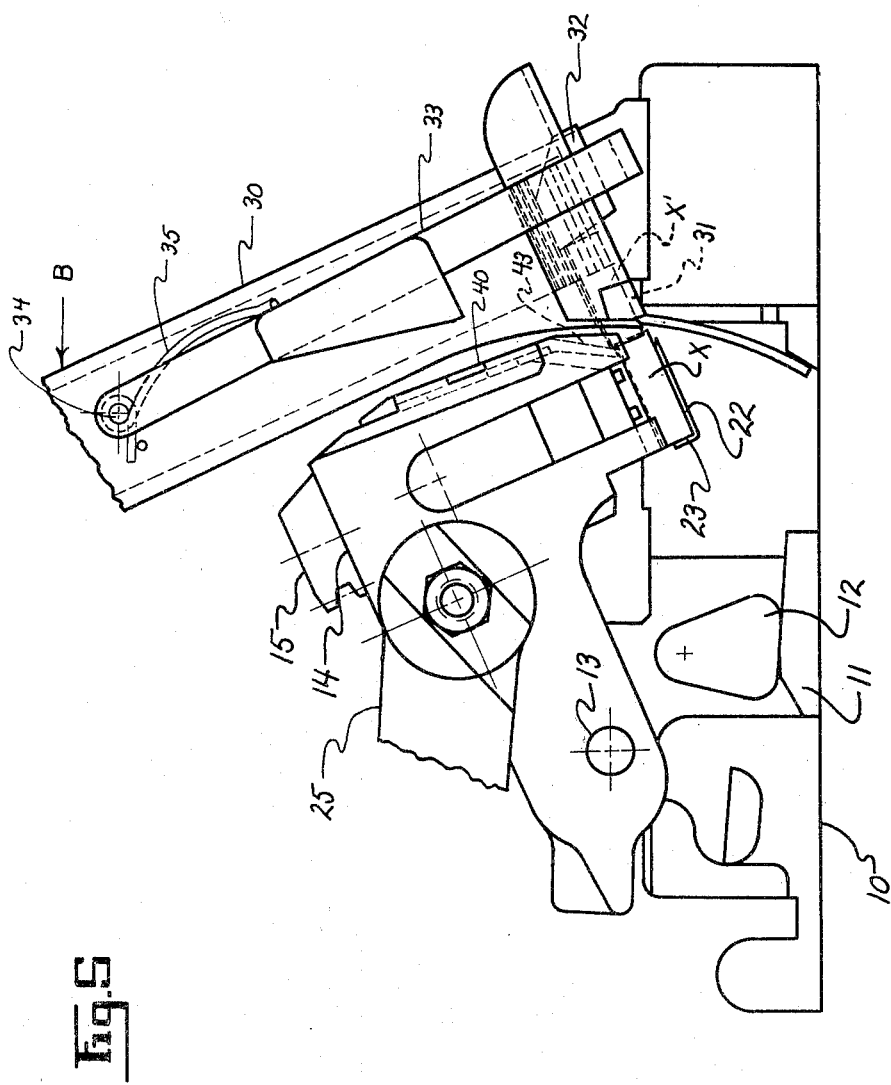

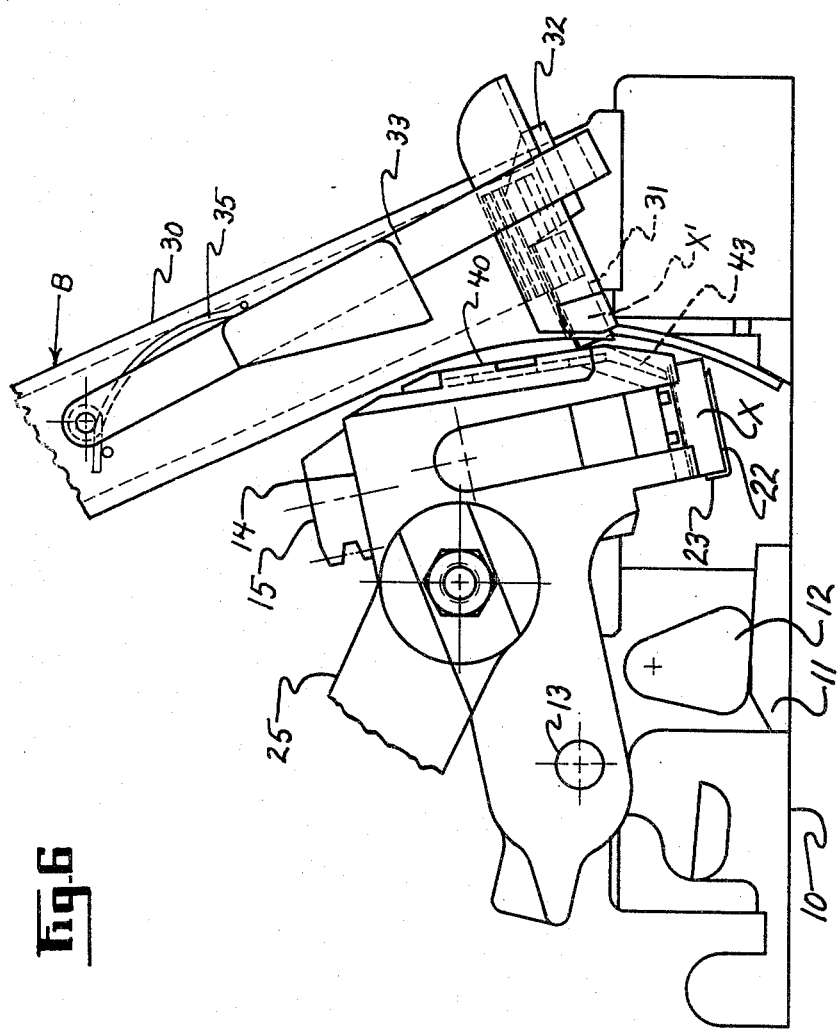

Oct. 3, 1950     H. C. DOOLITTLE     2,524,654
BOX STRAPPING TOOL
Filed June 20, 1945                              5 Sheets-Sheet 5
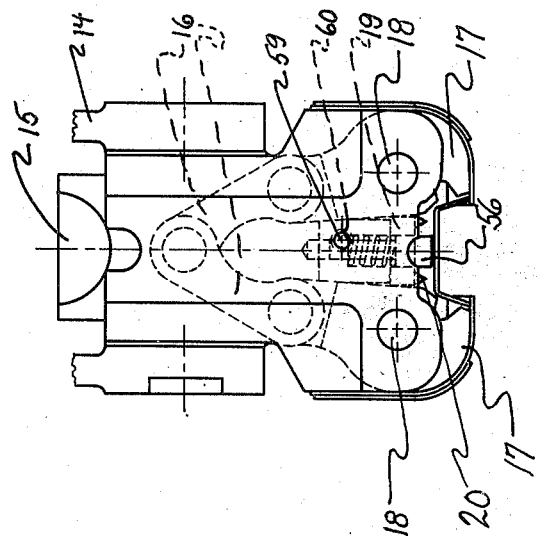
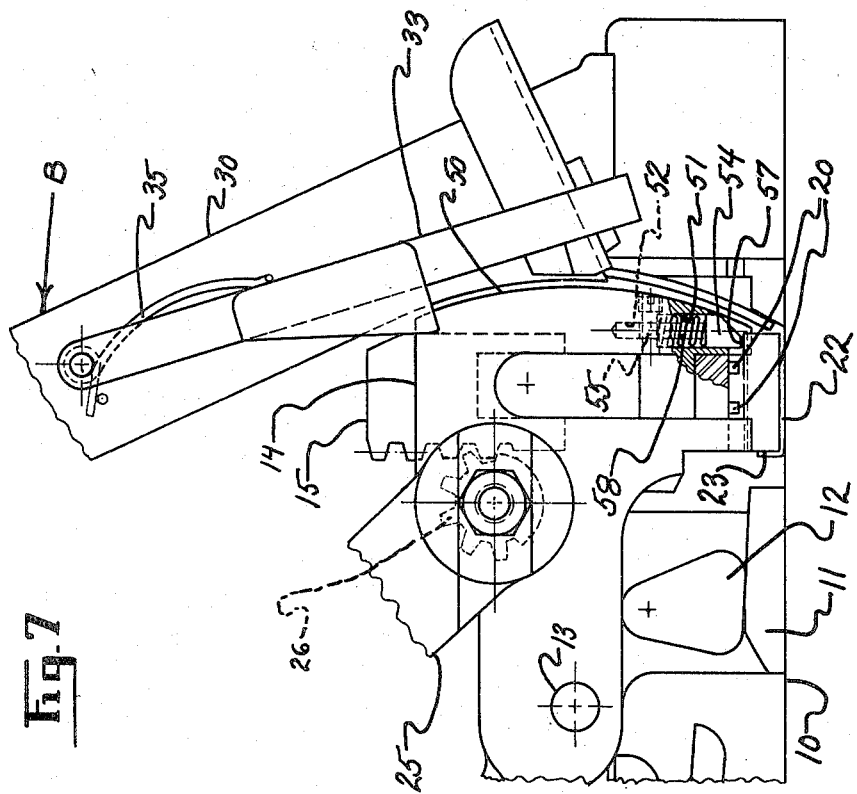
INVENTOR
HOWARD C. DOOLITTLE
BY
ATTORNEYS Patented Oct. 3, 1950

2,524,654

UNITED STATES PATENT OFFICE 2,524,654

BOX STRAPPING TOOL

Howard C. Doolittle, New Britain, Conn., assignor to The Stanley Works, New Britain, Conn., a corporation of Connecticut Application June 20, 1945, Serial No. 600,533

4 Claims. (Cl. 81—9.1)

This invention relates to box strapping tools of the type having a frame; sealing means carried by the frame and including a housing movable into and out of operative position with respect to the overlapped strap ends to be sealed, sealing jaws carried by the housing, and a lever for moving the housing into and out of operative position and for operating the jaws to effect a sealing operation after the housing has been brought to operative position; a magazine mounted on the frame and arranged to support seal members adapted to be brought into successive alignment with the sealing jaws when the latter are in raised or inoperative position; and means for feeding the seal members from the magazine into position between the jaws.

Tools of this sort have been objectionable in that it has been possible to jam the seals due to the fact that, while there is one seal member between the jaws, a second seal member may be partially fed from the magazine to a position where it overlaps the line of movement of the housing or head so that, when the housing is moved, the second seal member jams and often is bent. When this occurs, great difficulty is experienced in removing the misplaced seal member. The introduction of a second seal member may result either from faulty timing of the tool in normal operation, or due to the fact that an operator, not realizing that a seal member is within the jaws when the latter are raised, may manually operate the seal member feeding means.

The aim of the present invention is to provide an improved and simplified arrangement for preventing such jamming. More particularly, the aim of the invention is to provide, in a tool of this sort, a simple and effective means entirely automatic in operation which will make it impossible to feed or partially feed a seal member from the magazine into a position in which it can jam the tool when there is another seal member already in position between the jaws.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

As an instance of a use to which the improvements of the present invention may be applied, I have shown the same incorporated in a box strapping tool such as is illustrated and described in my Patent No. 2,218,023 issued October 15, 1940. In the accompanying drawings, only so much of the machine is illustrated as is necessary to make the present invention clear. While in this machine the sealing mechanism is pivoted on the frame for movement into and out of operative position, it is to be understood that the present invention may be applied to tools wherein the sealing mechanism is mounted for rectilinear movement and that the machine may be variously changed in its arrangement and details.

In said drawings:

Figure 1 is a partial side view of the tool with the sealing means shown in raised or inoperative position and with a seal member carried thereby, the jaws and one of the seal member supports being omitted, and this view further shows, in broken lines, portions of the sealing mechanism in operative position just prior to the actual operation of bending the seal member about the strap ends;

Fig. 2 is a front face view of the sealing mechanism in the full line position shown in Fig. 1, but showing both jaws and both seal supports;

Fig. 3 is a view similar to Fig. 1 but illustrating the parts in the positions which they occupy at the completion of a sealing operation.

Fig. 4 is a front face view of the sealing mechanism in the position shown in Fig. 3;

Fig. 5 is a view similar to Fig. 3 but illustrating the feeding means as having been manually operated to partially feed a seal member to a position where one end thereof is in overlapping position with respect to the seal member previously positioned between the jaws;

Fig. 6 is a view similar to Fig. 5 but showing the sealing mechanism as having been partially moved downwardly from the position shown in Fig. 5;

Fig. 7 is a side view of the tool with the sealing mechanism shown in the position indicated by broken lines in Fig. 1 and illustrating a somewhat different embodiment of the invention; and Fig. 8 is a front face view of the sealing mechanism in the position shown in Fig. 7, Referring to the drawings in detail, 10 indicates a frame provided with a foot 11 and a dog 12 between which one end of a strap is adapted to be clamped. The dog 12 is adapted to pivot about the center indicated by the crossed lines shown adjacent the top of the dog. The tool is provided with a stretching means, not shown, but which, as illustrated in my said patent, may have a movable foot and a cooperating dog for gripping a portion of the other end of the strap. Pivoted to the frame as at 13 is a housing or head 14 provided with a bore slidably receiving a cylindrical rack bar 15 pivotally connected at its lower end (Fig. 8), as by a pair of toggle members 16, to a pair of sealing jaws 17 pivoted to the housing on the shafts 18. An anvil 19 is supported at the bottom of the housing and has a plurality of downwardly extending protruding teeth 20 cooperating with the jaws to indent the seal member and deform it into tight interlocked relation with the overlapped strap portions in the same general manner as described in the patent to Webster No. 2,007,781 issued July 9, 1935. The bottom of the housing also has a pair of seal supports 21 partially surrounding the jaws and provided with opposed bottom flanges 22 and with end flanges 23 for supporting and locating a seal member X between the jaws preliminary to a sealing operation. Journaled on the housing is an operating lever or handle 25 which, as described in my said Patent No. 2,218,023, is associated with the rack bar 15 by a mutilated pinion 26, the construction and arrangement being such that, when the handle is thrown forwardly on its operative stroke, the housing will be moved to the position shown by broken lines in Fig. 1, and then, upon further forward movement of the handle, the jaws will be moved towards each other in order to effect the sealing operation.

The magazine, which is similar to that shown in my said patent, is designated generally by the letter B. The same comprises a rectangular open-ended, box-like structure 30 adapted to receive a stack of seal members. At the bottom of the magazine are opposed flanges 31 adapted to support the lowermost seal, and these flanges are generally in alignment with the seal supporting flanges 22 when the sealing mechanism is in raised or inoperative position (Fig. 1). Slidably mounted on these flanges 31 is a feeding member 32 which is connected to a lever 33 pivoted to the magazine at 34 and urged toward the sealing mechanism by a spring 35. The seal feeding means is operated by the handle 25 and, if desired, the arrangement shown in my said patent may be employed. In the present instance, however, I have shown the lever as having an offset cam edge 36 with which cooperates a roller or disk 37 carried by the handle 25, the arrangement being such that, when the handle is moved on its operative stroke, the roller 37 will engage the cam edge 36 to thereby cam the lever from the position shown in Fig. 1 to the cocked position shown in Fig. 3 and, while the handle is being moved on its reverse or inoperative stroke, the feeding member will advance the seal towards the sealing mechanism and snap it into place on the flanges 22 when the sealing mechanism reaches its uppermost position shown in Fig. 1.

With the arrangement so far described, it is possible to jam the machine by manually operating the seal feeding means to move a seal member from the magazine when the parts are in the position shown in Fig. 1, there being a seal member already positioned between the sealing jaws. This may be done inadvertently by a careless operator or by someone merely tampering with the machine, and when this occurs, a seal member, indicated by the letter X' is fed into overlapping position with the seal member X. When the sealing mechanism is now lowered, the lower edge of the housing will engage the seal member X' and bend it out of shape, thereby jamming the machine. The present invention relates to means for preventing such jamming, and the means by which this is accomplished will now be described. This means comprises, generally, a baffle member or shutter 39 slidably carried by the housing and arranged to cam the incorrectly, partially-fed seal member out of the path of movement of the sealing mechanism.

In the embodiment of the invention shown in Figs. 1 to 6, this baffle is in the form of a plate 40 mounted on the forward face of the housing. Extending laterally from the plate are wings 41 slidably fitting in grooves 42 in the forward face of the housing. At the lower end of the plate is an inclined surface 43 sloping downwardly and away from the seal feeding mechanism and terminating in edge 44. The baffle is urged downwardly by a pair of springs 45 secured at their lower ends to the housing and at their upper ends to the plate 40. Downward movement of the baffle is limited by the engagement of edges 46 on the housing with edges 47 on the baffle. When the baffle is in its lowest position (Fig. 2), a seal member having been introduced between the jaws, the lower edge 44 is in close proximity to the upper surface of the seal member, the space between them being less than the thickness of a seal member. If lever 33 is now manually moved into the position shown in Fig. 3 and then released, another seal member X' will be urged towards the sealing mechanism as illustrated in Fig. 5. However, the inclined surface 43 engages the second seal member X' and prevents further movement thereof. Now, when the housing is moved downwardly, the inclined surface 43 acts as a camming surface and the seal X' is cammed back into the magazine 30. Surface 43 on the plate 40 engages the second seal member X' (Fig. 6) and prevents it from jamming the tool.

When the housing has been moved to the position shown by the broken lines in Fig. 1 and the sealing jaws begin to close, the upper surface of the seal member X is moved upwardly against the anvil and is bent around the ends of the straps as in Fig. 4. As the seal member rises, the upper surface thereof engages edge 44 of the baffle, but since the baffle is slidably mounted, it moves upwardly. When the jaws are opened and the housing is moved away from operative position, the springs return the baffle to its original position.

Another embodiment of my invention is illustrated in Figs. 7 and 8. In this construction, the forward portion of housing 14 has a curved face 50. At the bottom of the housing, adjacent the lower edge of face 50, is a vertical bore 51 reduced in diameter at its upper end, as at 52. There is provided a baffle pin 54 with a stem 55 vertically mounted thereon, the pin having a forwardly facing inclined surface 56 sloping downwardly away from the seal feeding means and terminating in an edge 57. Pin 54 is slidably mounted in bore 51 and shaft 55 slidably fits in reduced bore 52. Resting between the upper end of bore 51 and the upper surface of baffle pin 54 is a helical compression spring 58 urging baffle pin 54 to project downwardly out of housing 14. Vertical movement of the baffle pin is limited in extent by a stud 59 extending into housing 14 from curved surface 50 and across a slot 60 in shaft 55 (Fig. 8). The extent of vertical movement of the baffle pin is thereby limited by the length of slot 60. When the pin is in extended position, the lower edge 56 of the baffle pin is in close proximity to the upper surface of a seal member resting between the jaws, the distance between the edge 56 and the upper surface of the seal member being less than the thickness of a seal member. The baffle pin therefore acts to prevent jamming of the tool in the same manner as the hereinbefore described baffle plate 40.

My invention makes impossible the jamming of a box strapping tool by inadvertent introduction of a second seal member into the sealing mechanism when another seal member is positioned between the jaws. The invention is simple in construction, easily assembled on the tool, and has a minimum of moving parts. At the same time, it is completely automatic in operation and is adaptable to various types of box strapping tools. It is to be understood that the embodiments shown are not limited to the box strapping tool illustrated in the drawings, but may be applied to various types of such tools.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a box strapping tool, a frame; sealing means carried by the frame including a housing movable into and out of operative position with respect to the strap portions to be sealed, sealing jaws carried by the housing, and means for moving the sealing means into and out of operative position and for operating the jaws; a magazine mounted on the frame and arranged to support seal members for successive alignment with the jaws when the sealing means is in inoperative position, means for feeding the seal members one by one from the magazine into position between the jaws, and a baffle slidably mounted on said housing adjacent said magazine at an angle to the path of movement of the seals from the magazine to the jaws and positionable by said housing so as to intercept the movement of an additional seal member from being fed between the jaws when a seal member is already in position therebetween and the jaws are in seal receiving position, said baffle having a camming surface against which said additional seal member is adapted to bear and arranged to cam such additional seal member out of the operative line of movement of said sealing means when said sealing means is being moved between its inoperative and operative positions.

2. In a box strapping tool, a frame; sealing means carried by the frame and including a housing movable into and out of operative position with respect to the strap portions to be sealed, sealing jaws carried by the housing, and operable means for moving the sealing means into and out of operative position and for operating the jaws; a magazine mounted on the frame and arranged to support seal members for successive alignment with the jaws when the sealing means is in inoperative position, means operated by said operable means for feeding the seal members one by one from the magazine into position between the jaws when said sealing means is in inoperative position, and a spring-pressed baffle mounted on the housing adjacent said magazine for movement at an angle to the path of movement of the seals from the magazine to the jaws and positionable by said housing so as to intercept the movement of an additional seal member from being fed from the magazine into jamming relation with the sealing means when a seal member is already positioned between the jaws, said baffle having a camming surface engageable with the advancing end of the additional seal member for camming the additional seal member out of the line of movement of the sealing means as the latter is being brought to operative position.

3. In a box strapping tool, a frame; sealing means carried by the frame and including a housing movable into and out of operative position with respect to the strap portions to be sealed, sealing jaws carried by the housing, means for supporting a seal member between the jaws while the latter are in open relation, and means for moving the sealing means into and out of operative position and for closing said jaws; a magazine mounted on the frame and arranged to support seal members for successive alignment with the jaws when the sealing means is in inoperative position, means for feeding the seal members one by one from the magazine into position on said supporting means between the jaws, a baffle slidably mounted on said housing adjacent the magazine for movement generally in the direction of movement of the housing and arranged to prevent an additional seal member from being fed into a jamming position with respect to the sealing means when a seal member is already positioned within the jaws, and spring means for urging said baffle member to an intercepting position where the baffle is spaced from a seal member already between the jaws a lesser distance than the thickness of a seal member.

4. In a box strapping tool, a frame; sealing means carried by the frame and including a housing movable into and out of operative relation with respect to the strap portions to be sealed, sealing jaws carried by the housing, means for supporting a seal member between the jaws while the latter are in open position, and means for moving the sealing means into and out of operative position and for operating said jaws; a magazine mounted on the frame and arranged to support seal members for successive alignment with the jaws when the sealing means is in inoperative position, means for feeding a seal member from the magazine onto said supporting means each time said sealing means is moved to inoperative position after a sealing operation has been performed, a baffle mounted on the housing for slidable movement relative thereto in the direction of movement of the housing and having an upwardly and outwardly inclined camming surface facing the magazine, and spring means urging said baffle downwardly to an operative position on the housing wherein said camming surface will be spaced from said seal member already between the jaws a lesser distance than the thickness of a seal member, whereby said camming surface will intercept an additional seal member during movement from the magazine when a seal member is already positioned between the jaws, said camming surface also being arranged to cam the additional seal member towards the magazine when the sealing means is moved on its operative stroke and said baffle being moved upwardly by the engagement of its lower end with the seal member between the jaws during the operation of deforming said seal member.

HOWARD C. DOOLITTLE.

REFERENCES CITED

The following references are of record in the file of this patent:

UNITED STATES PATENTS

| Number | Name | Date |
| --- | --- | --- |
| 2,218,023 | Doolittle | Oct. 15, 1940 |
| 2,336,264 | Leslie, 2d | Dec. 7, 1943 |